United States Patent [19]
Vanti

[11] 3,814,134
[45] June 4, 1974

[54] SERVO-OPERATED ELECTROVALVE
[75] Inventor: Lamberto Vanti, Milan, Italy
[73] Assignee: Fiat Societa Per Azioni, Turin, Italy
[22] Filed: Oct. 18, 1972
[21] Appl. No.: 298,589

[30] Foreign Application Priority Data
Oct. 21, 1971  Italy.................................. 30140/71

[52] U.S. Cl............ 137/627.5, 137/513.3, 137/517, 137/596.1
[51] Int. Cl.......................................... F16k 31/12
[58] Field of Search............ 137/517, 513.5, 596.1, 137/627.5; 91/35, 38

[56] References Cited
UNITED STATES PATENTS
| | | | |
|---|---|---|---|
| 2,437,991 | 3/1948 | Baston.................................. | 91/38 |
| 2,716,398 | 8/1955 | McMullen...................... | 137/517 X |
| 3,119,308 | 1/1964 | Dantowitz.............................. | 91/38 |
| 3,122,162 | 2/1964 | Sands............................ | 137/513.3 X |
| 3,512,552 | 5/1970 | Dobrikin.......................... | 137/627.5 |

Primary Examiner—Robert G. Nilson
Attorney, Agent, or Firm—Wenderoth, Lind & Ponack

[57] ABSTRACT

A servo-operated electrovalve includes a plurality of duct controlling pistons and fluid storing capacity means. One of the pistons controls a fluid discharge duct and has a throttling hole, as well as calibrated spring means urging the piston away from a valve seat of the discharge duct. The valve is able — to carry-out a pre-set pressure time discharge curve, comprising a first sudden pressure drop as obtained during filling the capacity means, a second slow pressure decrease through the throttling hole and a third sudden pressure drop, when the force of the spring means overcomes the action of discharge pressure fluid on the piston and moves the same away from the seat, thus freeing the discharge duct.

4 Claims, 2 Drawing Figures

3,814,134

SERVO-OPERATED ELECTROVALVE

BACKGROUND OF THE INVENTION

This invention concerns a servo-operated three-way electrovalve, f.i. of the type as described in applicant's co-pending U.S. Pat. application Ser. No. 180,264 and adapted to obtain a discharge phase carried-out according to a pre-set pressure time curve.

As is already well known, in feeding systems of electro-valves, as designed for servo-controlling elements, devices or equipment adapted to stop or limit a fluid flow in plants or the like, a valve control member, as e.g. an obturator or the like is often required to cause a fluid pressure decrease during a valve discharge phase, following a pre-set pressure time diagram. In particular, it is often suitable to have a pre-set pressure value decrease within a very short time followed by a slow decrease and finally by a sudden pressure drop down to zero.

Such pressure time decrease curve is advantageously used in servo-controlling plants or equipment wherein very wide pressure changes within a very short time are to be avoided and simultaneously whirling motions, water hammerings or other phenomena which would interfere with a proper servo-control operation are to be avoided.

Such an electrovalve discharge pressure curve generally comprises three different lengths or steps corresponding to pressure values depending on parameters that can be suitably changed in a pre-established way, in order to obtain different discharge curves showing substantially the same features as the three step curve.

These discharge curves could be obtained by suitably providing two or more co-operating electrovalves, associated with one another in such a manner as to meet pre-set requirements. Obviously this would result in a noticeably complex valve set structure and thus in operating, manufacturing and connection difficulties, as well as in a production cost increase and so on.

SUMMARY OF THE INVENTION

An object of this invention is to prevent the above and further drawbacks, by providing a single servo-operated electrovalve adapted to obtain discharge curves of the above stated type.

According to this invention, an electromagnetic pilot servo-operated electrovalve, in particular of a three-way type and adapted for controlling fluid flow throttling or stopping in pneumatic, hydraulic or like equipment, has a structure similar to that disclosed and claimed in U.S. Pat. application Ser. No. 180,264, and is characterized in that the obturator thereof is formed by a plurality of single pistons, which can be controllably moved in suitable sequences preferably along the same axis within a cylinder having at least one passage leading to capacity means. One of the pistons has a throttling hole in its bottom wall, that is substantially aligned with a fluid valve discharge duct, while the cylindrical wall of the piston comprises suitable ports for communication with the cylinder and passage. A calibrated spring means acts on the piston in order to maintain the same in a spaced relationship with a discharge duct valve seat in such a manner that, when pressure fluid is being discharged, the piston firstly contacts the discharge duct valve seat and then it is retracted from the seat. When the piston contacts the seat, the above stated capacity means is firstly filled with pressure fluid and a sudden pressure drop occurs followed by a slow pressure fluid discharge through the piston throttling hole, and finally when the fluid pressure value falls under a pre-set value corresponding to a load as applied by the calibrated spring and the spring urges the piston away from the seat, a sudden pressure drop down to atmospheric value is obtained due to a free fluid discharge through the open discharge duct.

The above stated three discharge phase steps (capacity means filling, throttled outflow, free outflow) make it possible to attain a required time pressure discharge curve.

DETAILED DESCRIPTION OF THE INVENTION

Figure 1:
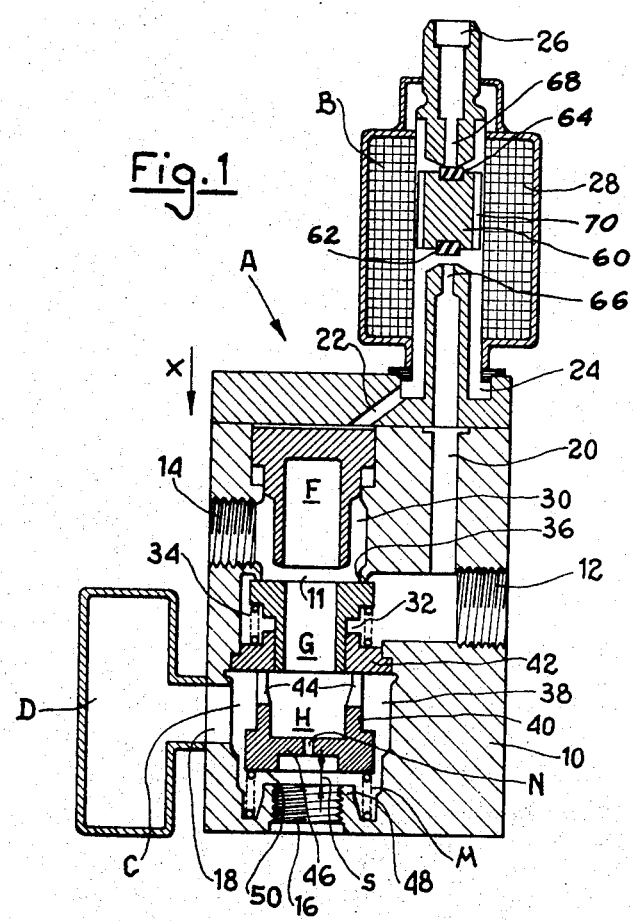
FIG. 1 is a vertical diagrammatic section of a servo-operated electrovalve having a pre-set pressure time discharge curve.

As previously stated, the overall design of the shown electrovalve is substantially similar to that of the electro-valve disclosed in U.S. Pat. application Ser. No. 180,264, and thus only the essential valve components will be hereinafter described.

An electrovalve A is designed to control pneumatic, hydraulic or the like members, devices or equipment by means of which fluid flow in given systems can be limited or stopped, the valve being servo-operated by an electromagnetic pilot device B.

The electrovalve A comprises a body 10 having a cylindric recess C formed therein and defining a valve operating cylinder, wherein a plurality of duct openings are formed, namely: a feeding duct 12 for feeding a driving fluid (e.g. hydraulic oil, compressed air or the like) a delivering duct 14 adapted to deliver fluid to a servo-control device, usually in the form of a cylinder-piston set (not shown), a discharge duct 16, as well as a passage 18 by means of which cylinder C can communicate, under given conditions, with an auxiliary chamber D forming capacity means for housing a fluid volume during a valve discharge operation.

Valve body 10 also comprises ducts 20 and 22, that can be connected with each other through a chamber 24 leading to a pilot B. Pilot B controls chamber 24 by means of an on-off obturator device as disclosed in U.S. Pat. application No. 180,264 in order to allow a communication between ducts 20 and 22 when a pilot electromagnet is de-energized, and to discontinue such communication when the electromagnet is energized. This latter occurrence involves the opening of a nozzle 26 and the cutoff of duct 20, with a fluid discharge from duct 22 through chamber 24 and nozzle 26. The coil of pilot electromagnet is indicated with the reference 28.

Specifically, coil 28 has an axial bore formed therein. The lower end of the bore communicates with duct 20 and with duct 22, and its upper end is vented at 26. An axially movable core 60 is located in the bore of the coil and is connected with oppositely located plugs 62 and 64 positioned for fluid-tight abutment on a nozzle 66 of duct 20 or on a nozzle 68 of vent 26. Longitudinal passages, such as formed by grooves 70 about the core 60, provide fluid communication between the parts above and below the core.

The coil 28 and core 60 are arranged and magnetically correlated so that when the electromagnetic pilot device B is de-energized, the plug 64 closes the vent duct 26, while the plug 62 is spaced from mozzle 66, as shown in the drawing. Therefore fluid communication is provided and maintained between ducts 20 and 22, and any fluid pressure applied at feeding duct 12 is also applied above the piston F, for actuating the device as described below. On the contrary, when such pilot device is energized, the core 60 is magnetically downwardly displaced so that the plug 62 closes the nozzle 66, discontinuing the fluid comjunication, while the space above the piston F is vented via the duct 22, the bore in the coil 28, the passages 70 formed about the core 60, the nozzle 68, from which plug 64 has been spaced, and the vent 26.

The operating cylinder C may be considered as subdivided into three sections or single chambers, each of which houses a piston, F, G, H respectively, the pistons lying in aligned relationship with one another and being controllably movable along the cylinder C. As previously stated, the three single pistons F, G, H form together an electrovalve obturator.

Top piston F can be moved within a related cylinder zone or chamber 30, according to pressure conditions therein, and it can be considered as a floating piston. The middle piston G is tubularly shaped and it can be moved within a cylinder intermediate chamber 32 under the action of a suitable spring 34 that urges the same against an annular upper seat 36, between chambers 30, 32. Finally, in a cylinder bottom chamber 38 is slidingly housed bottom piston H that is acted upon by a calibrated spring M adapted to exert thereon an upwardly directed thrust. The action of spring M tends to always urge piston H upwardly, with the upper edge of its cylindrical wall 40 contacting the base of a sleeve 42 that slidingly houses piston G. The cylindric wall 40 of piston H has therein openings 44, while the circular bottom wall 46 of piston H has a centrally located throttle hole N that is aligned with the longitudinal axis of cylinder C and discharge duct 16. Duct 16 defines an annular seat 48, adapted to abut with a bottom edge 50 of the piston H, when the piston lies in its lowered position.

The electrovalve of this invention is shown in FIG. 1 in its discharge phase and more exactly in the last step of discharge phase, wherein the valve obturator (as formed by said three pistons F, G, H) lies in its lifted position.

Supposing now that a valve feeding phase should be started, duct 12 that is connected to a pressure fluid source (not shown) must be hydraulically or pneumatically connected to duct 14 leading to and operating use device (not shown and in the form e.g. of a cylinder-piston set). The electromagnet 28 of pilot B is then switched-off in order to close nozzle 26 and put ducts 20, 22 in communication with each other through chamber 24.

Then, pressure fluid coming from the source flows through 20, 22 into chamber 30, wherein it exerts a given thrust on the top of piston F, urging and moving the same downwardly in the direction of arrow X. During its downwardly directed stroke, piston F firstly abuts on the top of middle piston G and then it continues its stroke along with piston G in order to open the annular seat 36 and then establish a hydraulic or pneumatic communication between ducts 12, 14 to feed pressure fluid to use device.

Said downward motion of piston G is carried-out against the action of spring 34 with a stroke as defined by the contact of a piston shoulder with this sleeve 42. During this operating phase, piston H is kept stationary against sleeve 42 by the action of spring M. With pistons F and G in their downward end stroke position (not shown), a fluid connection is thus established between ducts 12, 14, while discharge duct 16 is kept tightly closed.

Figure 2:
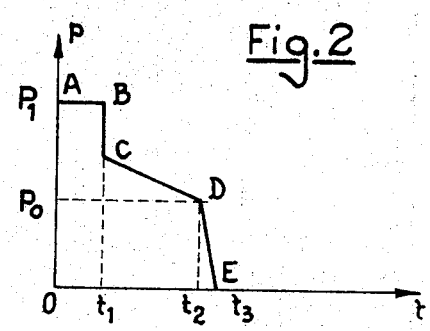
FIG. 2 diagrammatically shows the pressure time discharge curve as obtained by the electrovalve of FIG. 1.

To carry out a discharge phase according to a pressure time curve as shown in FIG. 2, the electromagnet 28 is switched-in in order to open nozzle 26 and close duct 20, chamber 24 being therefore put in communication with the atmosphere or with an outer environment. Thus, pressure conditions are established within cylinder C to move upwardly pistons F, G in a direction opposite to arrow X. In particular, piston F reaches its upper endstroke position within chamber 30, while the fluid above the top thereof is discharged through duct 22, chamber 24 and nozzle 26. Simultaneously tubular piston G reaches its end-stroke upper position, wherein the top thereof engages with annular seat 36 and closes the same. Now, the communication between feeding duct 12 and user duct 14 is discontinued, while communication is established between duct 14 and chamber 38 through a tubular inner passage of piston G, in order to start a discharge phase.

Assuming that for calibrating spring M, a threshold value $P_0$ is selected corresponding to a thrust on piston H lower than that due to a pressure value $P_1$ within cylinder C, piston H is downwardly forced by pressure $P_1$ that overcomes the action of the spring M, the piston abutting with annular seat 48 and closing duct 16. The pressure fluid is firstly discharged through 14, 11, 44, 18 into chamber D in order to carry-out a curve length BC of FIG. 2. After such a nearly instantaneous pressure drop $\Delta_p$, pressure fluid is discharged through said throttling hole N and duct 16, whereby a slower pressure decrease occurs, corresponding to curve length CD of FIG. 2. Finally, when the fluid pressure within chamber 38 and the use device falls below pressure value $P_0$ (point D of FIG. 2), the force of the spring M overcomes that of the fluid pressure and upwardly forces piston H in order to withdraw the piston bottom edge 50 from annular seat 48 and establish a free communication between chamber 38 and discharge duct 16. Therefore a free fluid outflow through duct 16 is obtained without fluid passage through hole N, as shown in FIG. 1. This is the discharge phase last step, corresponding to curve length DE of FIG. 2, wherein an atmospheric pressure value is quickly attained.

The whole discharge phase as formed by the three steps or periods $O-t_1$; $t_1-t_2$; $t_2-t_3$ is clearly shown by the pressure time curve of FIG. 2.

It is therefore apparent that the electrovalve according to this invention is essentially characterized in that it comprises an obturator formed by a plurality of pistons, a middle one of the pistons being tubularly shaped, while a bottom piston is acted upon by a calibrated spring and is formed with a throttling hole, the valve also comprising a capacity chamber D that acts in the discharge curve first step. The electrovalve makes it possible to attain a discharge phase that is subdivided in required steps or periods, each of which comprises a required pressure drop.

It is to be pointed out that different discharge curves similar to that of FIG. 2 can be obtained, either by varying value $\Delta_p = BC$ (instantaneous pressure drop) or by acting on the capacity value of chamber D or by changing the inclination and length of step CD by an adjustment of the throttling hole inner diameter, or by varying said spring threshold value $P_0$, or finally by simultaneously varying two or more of the above stated parameters.

Various changes and modifications of this invention may be made by those skilled in the art, without departing from the spirit and scope of the invention.

I claim:

1. A three-way electrovalve for control of fluid-operated equipment and capable of obtaining a predetermined time-pressure discharge curve when the previously pressurized equipment is communicated with a discharge outlet upon actuation of said electrovalve, said electrovalve comprising:
    a valve body having therein an upper delivery chamber, a central chamber and a lower discharge chamber in communication, said upper and central chambers being separated by a stationary annular seat of said valve body;
    a pressure fluid inlet opening into said central chamber;
    a pressure fluid delivery duct communicating with said upper chamber;
    a discharge outlet communicating with said lower chamber and having an annular outlet seat extending upwardly into said lower chamber;
    an auxiliary chamber capacity means communicating with said lower chamber;
    a lower piston mounted for axial movement within said lower chamber; said lower piston having a metering bore therethrough;
    metered spring means for biasing said lower piston upwardly away from said annular outlet seat;
    a central tubular piston mounted for axial movement in said central chamber, said central piston having an enlarged upper portion adapted to engage said annular seat between said upper and central chambers, said central piston having a bore forming a passage between said upper and lower chambers and means to urge said central piston upwardly into engagement with said annular seat;
    an upper piston axially movable in said upper chamber;
    a remotely actuable pilot device having a chamber therein, said chamber communicating with an upper part of said upper chamber above said upper piston and with an exhaust vent;
    a passage having a nozzle at one end thereof opening into said pilot device chamber and communicating at the other end thereof with said inlet; and
    an element movable within said pilot device chamber from a first position blocking said exhaust vent and opening said nozzle to a second position opening said exhaust vent and blocking said nozzle;
    whereby when said element is in said first position thereof and pressure fluid is introduced to said inlet, said fluid passes through said passage, said nozzle, said pilot device chamber into said upper part of said upper chamber to move said upper piston downwardly into contact with said central piston to urge said central piston out of engagement with said annular seat and to provide communication of said fluid between said inlet and said delivery duct; and
    whereby when said element is moved to said second position thereof, said pressure in said upper part of said upper chamber is vented through said exhaust vent, said upper and central pistons are moved upwardly, fluid to be discharged from said delivery duct passes through said bore in said central piston to urge said lower piston into engagement with said outlet seat and to pressurize said capacity means at an initial pressure, said fluid from said capacity means is slowly metered through said metering bore until the pressure of said fluid reaches a lower pressure less than the force of said metered spring means, whereupon said metered spring means urges said lower piston out of engagement with said outlet and said fluid is then rapidly discharged through said delivery duct.

2. The electrovalve as claimed in claim 1, wherein said metering bore and the inner volume of said capacity means are designed to provide that the pressure of said fluid progressively decreases down to said lower pressure in a predetermined time interval before abrupt discharge thereof through said delivery duct.

3. The electrovalve as claimed in claim 1, wherein said three chambers and said three pistons are co-axially located in said valve body.

4. The electrovalve as claimed in claim 1, wherein said lower piston has side walls with passages therein to provide passage for said fluid towards said capacity means, and has a planar lower face for fluid-tight abutment on said outlet seat, said metering bore being formed in said planar face.

* * * * *